United States Patent [19]
Portnoy et al.

[11] Patent Number: 5,658,524
[45] Date of Patent: *Aug. 19, 1997

[54] CELLULOSE ARTICLE MANUFACTURING METHOD

[75] Inventors: Norman Abbye Portnoy, Clarendon Hills; Edward Makoto Kajiwara, Park Ridge; Paul Edmund Ducharme, Jr., Tinley Park, all of Ill.

[73] Assignee: Viskase Corporation, Chicago, Ill.

[ * ] Notice: The term of this patent shall not extend beyond the expiration date of Pat. No. 5,277,857.

[21] Appl. No.: 434,709

[22] Filed: May 4, 1995

Related U.S. Application Data

[63] Continuation-in-part of Ser. No. 179,418, Jan. 10, 1994, Pat. No. 5,451,364, which is a continuation-in-part of Ser. No. 822,506, Jan. 17, 1992, Pat. No. 5,277,857.

[51] Int. Cl.$^6$ ................................................ B29C 47/88
[52] U.S. Cl. .................... 264/559; 264/561; 264/562; 264/564; 264/186; 264/203; 264/209.5; 264/210.7
[58] Field of Search ................... 264/559, 561, 264/562, 564, 186, 187, 203, 209.5, 210.7; 106/203

[56] References Cited

U.S. PATENT DOCUMENTS

| | | |
|---|---|---|
| 2,999,756 | 9/1961 | Shiner et al. . |
| 2,999,757 | 9/1961 | Shiner et al. . |
| 3,280,234 | 10/1966 | Osborn . |
| 4,195,054 | 3/1980 | Verellen et al. ............... 264/561 |
| 4,261,943 | 4/1981 | McCorsley, III ............... 264/187 |
| 4,317,794 | 3/1982 | Gord et al. ..................... 264/561 |
| 5,252,284 | 10/1993 | Jurkovic et al. ............... 264/187 |
| 5,277,857 | 1/1994 | Nicholson et al. ............. 264/203 |
| 5,451,364 | 9/1995 | Ducharme, Jr. et al. ....... 264/559 |

FOREIGN PATENT DOCUMENTS 42 19 658 C2   12/1993   Germany .

*Primary Examiner*—Mathieu D. Vargot
*Attorney, Agent, or Firm*—Roger Aceto

[57] ABSTRACT

In a method for forming a cellulose tube suitable for use as a food casing or as cellophane film, in which a solution of nonderivatized cellulose, tertiary amine N-oxide and water is extruded through an air gap of at least five inches, and into a water bath, such that a wet cellulose tube is formed. The wet tube is inflated from about 55% to 140% or more and dried thereby substantially retaining its work-to-rupture characteristics, especially when compared to viscose-derived tubes.

8 Claims, 2 Drawing Sheets

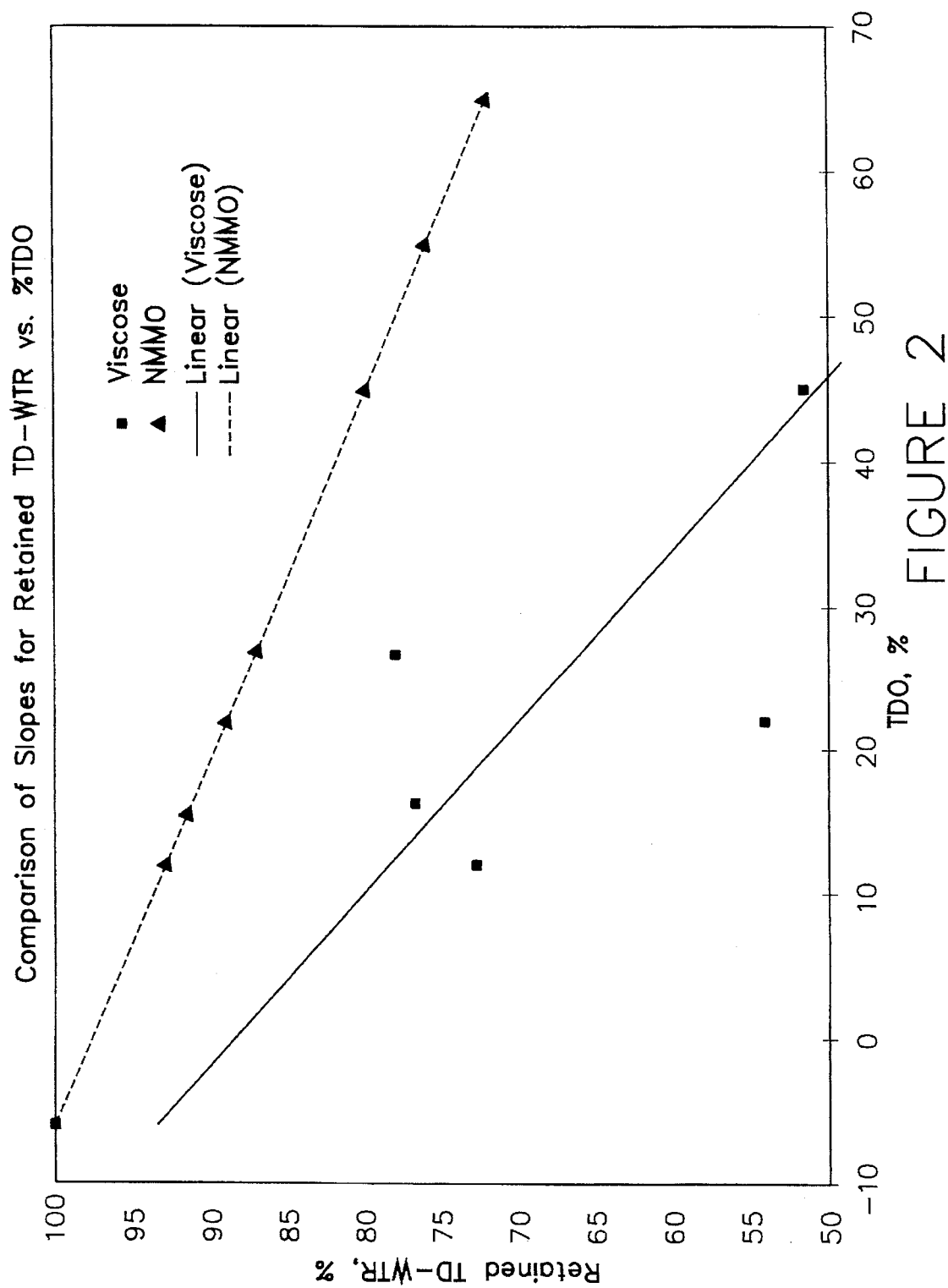

CELLULOSE ARTICLE MANUFACTURING METHOD

RELATED APPLICATIONS

This is a continuation-in-part application of application Ser. No. 08/179,418, filed Jan. 10, 1994 now U.S. Pat. No. 5,451,364, which is a continuation-in-part of 07/822,506, filed Jan. 17, 1992, now U.S. Pat. No. 5,277,857, issued on Jan. 11, 1994. Both the patent and the application are herein incorporated by reference.

TECHNICAL FIELD

The present invention relates to a method of forming a cellulose film suitable for use as a food casing or as a bioriented and balanced cellulose film, from a solution composed of nonderivatized cellulose, tertiary amine N-oxide, and water.

BACKGROUND OF THE INVENTION

Cellulose is used in the production of a number of products well known in the art. One product is a cellulose food casing. These generally are seamless tubes formed of a regenerated cellulose and contain a plasticizer such as water and/or a polyol such as glycerine. Plasticization is necessary because otherwise the cellulose tube is too brittle for handling and commercial use.

A non-reinforced type of cellulose casing commonly is used in the manufacture of skinless hot dogs. These cellulose food casings generally consist of a tubular film of pure regenerated cellulose having a wall thickness ranging from about 0.025 mm to about 0.038 mm and in diameters of from about 14 to 50 mm. For some purposes, larger casings are used where the tubular wall thickness is up to 0.076 mm and the diameter is up to about 203 mm.

Another cellulose product is cellulose film. For many years a transparent cellulose film commonly known as cellophane was the film of choice for use as a wrapping and packaging material. Both casing and cellophane are most commonly produced by the well known "viscose process".

In this process, a natural cellulose, such as wood pulp or cotton linters, first is treated with a caustic solution to activate the cellulose to permit derivatization and extract certain alkali soluble fractions from the natural cellulose. The resulting alkali cellulose is shredded, aged, and treated with carbon disulfide to form cellulose xanthate. The cellulose xanthate is dissolved in a weak caustic solution. The resulting solution, or "viscose", is ripened, filtered, deaerated, and extruded.

For use as a food casing, the viscose is extruded as a tube through an annular die and about a self-centering mandrel into acidic coagulation and regenerating baths containing salts and sulfuric acid. For films, the extrusion can be as a sheet or as a tube that is later slit to form a sheet of film.

In the acidic baths the cellulose xanthate, is converted back to cellulose. The acid bath decomposes the cellulose xanthate in a chemical reaction with the result that a pure form of cellulose is coagulated and regenerated. Initially, the coagulated and regenerated cellulose is in a gel state. In this gel state, the cellulose product is first run through a series of rinse water dip tanks to remove by-products formed during regeneration.

During regeneration, the chemical reaction liberates sulfur product and gases such as hydrogen sulfide, carbon disulfide, and carbon dioxide through both surfaces of the gel. These gases are noxious and toxic, so their containment and recovery imposes a considerable burden on the manufacturing process. Moreover, when extruded as a tube, gases generated at the internal surface of the extruded gel tube can accumulate within the tubing and consequently present special problems. The pressure build up of gases accumulating within gel tubing causes undesirable diameter variations and therefor variations in film thickness and width. To prevent this, the gel tubing is punctured periodically to vent the accumulated gases. This puncturing process, involving procedures to puncture, vent, and then seal the punctured gel tube, results in an undesirable interruption of the manufacturing process. Also, gases which evolve may become entrapped within the structure of the gel, causing bubbles that weaken the resulting casing or film.

The gel product, to some extent, retains low residual levels of the sulfur compounds produced during regeneration. While care is taken to remove all residual sulfur compounds by washing the gel tube or film, the final product may still contain trace amounts of these compounds. The gel product then is treated with a glycerine humectant and dried to about 15% moisture based on total casing weight. For purposes of reference, a cellulose which is derivatized and then regenerated back to cellulose by a chemical reaction in the viscose process is sometime referred hereinafter to "viscose cellulose".

When formed as a tube, the viscose cellulose gel product is inflated during the drying process and stretched longitudinally to provide a degree of transverse and machine direction orientation to the dried cellulose tube.

It is known in the food casing art that a degree of both machine direction ("MD") and transverse direction ("TD") orientation, particularly to provide wet strength, is required for acceptable use of the cellulose tube as a food casing. For example, orientation decreases the extensibility of the casing but increases tensile strength. However, to function as a food casing some degree of extensibility must be retained. Thus, orientation must be accomplished so as to balance the desirable properties of both extensibility and tensile strength in both the MD and TD directions.

One method of producing a stronger viscose cellulose casing is seen in U.S. Pat. No. 2,999,757. Here, an extruded viscose tube is fully regenerated and some degree of orientation is provided by maintaining the tube in an inflated condition as it passes through a dryer. The inflation is sufficient to impart a 35% to 55% circumferential stretch and the pull through the drier is sufficient to impart a 2% to 8% machine direction stretch during drying. The result is a food casing having a wall thickness (dry) of 0.94 mils (0.037 mm) which when rewet retains substantially all of the stretch imparted during drying.

This patent further suggests that 55% TDO is about the maximum possible for viscose cellulose tubing. According to the '757 Patent, when the viscose cellulose is stretched transversely more than 55%, many operating problems are encountered. First, it is difficult to transversely stretch cellulose casing during drying beyond about 55% as the casing is more likely to break in the drier when the TDO is excessive. Further, as casing is stretched over about 55%, it rapidly loses desirable physical properties. The resulting casing has little or no residual stretch upon rewetting and will tend to break excessively when subjected to the rigors of stuffing and processing the stuffed casing.

In addition to placing an upper limit of about 55% on the transverse stretch, the '757 Patent also indicates that the film wall thickness is critical. In the operative examples of the '757 Patent, the wall thickness of the casing (when dry) preferably is about one mil.

An alternate cellulose production method involves forming a cellulose solution by means of a simple dissolution rather than requiring prior derivatization to form a soluble substance, as in the viscose process. U.S. Pat. No. 2,179,181 discloses the dissolution of natural cellulose by a tertiary amine N-oxide to produce solutions of relatively low solids content, for example, 7 to 10% by weight cellulose dissolved in 93 to 90% by weight of the tertiary amine N-oxide. Later patents provide for increasing the amount of cellulose in the solution. The cellulose in the resulting solution is nonderivatized prior to dissolution.

For purposes of this specification, "nonderivatized" cellulose means a cellulose which has not been subjected to covalent bonding with a solvent or reagent but which has been dissolved by association with a solvent or reagent through Van der Waals forces such as hydrogen bonding.

Such solutions, when extruded into a nonsolvent, cause the dissolved cellulose to regenerate by precipitation. For purposes of this invention "nonsolvent" means a liquid which is not a cellulose solvent. This alternate cellulose production method has been used primarily to produce filaments and fibers rather than films.

U.S. Pat. No. 3,447,939 discloses use of N-methyl-morpholine-N-oxide ("NMMO") as the tertiary amine N-oxide cellulose solvent wherein the resulting solutions, while having a low solids content, nevertheless can be used in chemical reactions involving the dissolved compound, or to precipitate the cellulose to form a film or filament.

More recent patents such as U.S. Pat. Nos. 4,145,532 and 4,426,288 improve upon the teachings of the '939 Patent.

Canadian patent No. 1,171,615 discloses a dialysis membrane formed of nonderivatized cellulose by extrusion through a spinneret having a slot-width of 180 mm and a gap adjustment of 0.6 mm.

German Patent 42 19 658 C2 suggests manufacture of film strips having a thickness (dry) of about 0.012 mm which is formed by extrusion of a nonderivatized cellulose through a flat sheet die having a die length of 4 cm. Various die widths were used from 0.005 cm to 0.010 cm to make the film strips.

Using NMMO as a solvent for cellulose eliminates the need for derivatizing the cellulose and consequently, it eliminates problems associated with chemical reactions such as the generation of toxic and noxious gases and sulfur compounds. For purposes of reference, a cellulose which is dissolved by NMMO and then regenerated back to cellulose by contacting the solution with a nonsolvent is sometimes referred to hereinafter as "non derivatized cellulose" or "NMMO cellulose".

Even with this advantage, to applicants' knowledge, and prior to the disclosure in the parent application (now U.S. Pat. No. 5,277,857), solutions of NMMO and cellulose have been used primarily to manufacture fibers and filaments and not in the commercial manufacture of cellulose films or food casings. This may be due in part to the fact that the solution exhibits thermoplastic behavior with a melting point of about 65° C., so it is normally solid at the temperature used in the extrusion of viscose.

It is speculated that another reason why this solution has not been commercially used in manufacture of tubular food casings or films is that at 65° C. it has a viscosity significantly higher than the viscosity of the viscose heretofore used in the production of cellulose food casings. In particular, a solution of cellulose and NMMO may have a molecular weight of about 80,000 to 150,000 and a viscosity in the range of about 1,000,000 to 3,500,000 centipoise. The high molecular weight and viscosity is because the dissolution of the cellulose does not affect the degree of polymerization. Viscose, for manufacture of frankfurter casing (wherein the degree of polymerization is affected by the derivatization process), has a molecular weight in the range of about 95,000 to 115,000 and a viscosity of only 5,000 to 30,000 centipoise.

From a cellulose article manufacturing process standpoint, these differences are important because after dissolution the process steps are dependent on whether cellulose has entered into a covalent bond with the solubilizing reagent, i.e., has been derivatized. This is so in the case of the well-known and commercially practiced viscose process. When a cellulose derivative is processed into the shaped article, the derivative such as viscose is first partially coagulated in the extrusion bath and then subsequently hydrolyzed back to cellulose, i.e., cellulose is regenerated. During this hydrolysis and while the derivative is still in a "plastic" state, the reforming cellulose crystallites can be stretched and oriented to give desirable commercial properties such as high tensile strength or burst strength. However, a disadvantage of this general approach is that since a cellulose derivative has been hydrolyzed, additional byproducts are formed. This significantly complicates cellulose recovery.

By contrast, when there is a direct cellulose dissolution such as by a solvent concentration of NMMO and water, orienting the cellulose molecules during the reorganization of the cellulose article is more difficult because there is no covalent bond to break. So reorganization is essentially a physical dilution or decomplexation. However recovery is less complex and, at least in the cellulose/NMMO/$H_2O$ system, is commercially feasible.

U.S. Pat. No. 4,246,221 and East German Patent No. DE 218 121, teach that solutions of cellulose, NMMO and water may be extruded through a spinneret and longitudinally pulled through a 12 inch long air gap into a precipitating bath to form very small diameter solid fibers which have a tensile strength, as measured in grams per denier, greater than comparable rayon fibers regenerated from viscose.

It will be appreciated by those skilled in the art, that manufacture of cellulose fibers and filaments by extrusion through orifices only 2–4 mils in diameter, or extrusion through slot dies, is nonanalogous to the manufacture, by extrusion, of large diameter tubular films having a minimum inside diameter of 0.5 inches (12.7 mm) or more and a wall thickness of 0.0015 inch (0.038) or less.

In U.S. Pat. No. 5,277,857 ("'857 Patent") there is disclosed a method and apparatus for manufacturing a large diameter (at least 14.5 mm) tubular film, suitable for use as a food casing, from a cellulose solution, in particular, a solution of cellulose, an amine oxide cellulose solvent (NMMO) and water (hereinafter sometimes referred to as "dope"). As disclosed in this patent, the solution, solid at room temperature, is melted and extruded through an air gap and into a nonsolvent liquid such as a water bath.

In the water bath, the nonderivatized cellulose regenerates by precipitation. The resulting gel tube can be treated with water, a polyhydric alcohol such as glycerine, or other water soluble softening agent such as a polyalkylene oxide or a polyalkylene glycol prior to drying.

While tubular films of nonderivatized cellulose were successfully made using the teachings of the '857 Patent, it was found that the tubular films were of limited use. This is because the transverse tensile strength needed improvement, as did the balance between the MD and TD tensile strengths.

To some extent, the TD tensile strength of tubular films prepared by the teachings of the '857 Patent were improved by increasing the length of the air gap. This improvement is disclosed in a application Ser. No. 08/179,418 filed Jan. 10, 1994 now U.S. Pat. No. 5,451,364 which is incorporated herein by reference. In brief, it was found that if the extruded tube was passed through an air gap length of about 6 to 12 inches, the resulting tube, dried under low inflation pressure, produced a tubular film 0.80 to 1.20 mils thick wherein the ratio of MD:TD tensile strength of the rewet film was about 2 or less and the TD tensile strength was at least about 2.0 lbs/in·mil (about 1670 to 2500 psi). However, even these values, and particularly the TD tensile strength, needs improvement to compete favorably with a conventional cellulose food casing made using the viscose process.

Accordingly, one object of this invention is to provide a method of forming a seamless tube of nonderivatized cellulose having a relatively high TD tensile strength and an improved balance of the MD:TD tensile strength.

As noted above, another cellulose product is cellulose film as may be used for wrapping various articles such as candy, cigars and in other clear overwrap packaging markets. For purposes of making cellophane sheets, the viscose generally is cast or extruded through a slot die. Drying usually is accomplished by supporting the gel cellulose on heated drums. Slot casting of sheets allows some degree of orientation in the machine direction by controlling the speeds at which the cast film is pulled forward from the slot die and through the regenerator baths.

As the sheet dries, it shrinks. If transverse direction shrinkage is not restrained, the thickness of the film is increased and the width decreases. Restraint of transverse shrinkage is minimized by tentering and this provides the film with some degree of transverse orientation. Typically, a cellophane cast as a sheet will, after drying, be on the order of a mil thick (0.025 mm) and have an unbalanced MD and TD orientation. For example, it may have an MD tensile strength of 18,000 psi (124.13 MPa) and a TD tensile strength of 8,000 psi (55.17 MPa).

Due in part to this unbalanced nature and in part to the rise in use of bioriented polypropylene, the use of cellophane has declined. Polypropylene is a relatively inexpensive thermoplastic material that is melted and extruded as a tube. While still soft, the tube is expanded both diametrically and longitudinally to provide a thin film which has a high degree of biorientation. For example, biaxially oriented polypropylene ("BOPP") films are made in thicknesses of 0.8 mils (0.02 mm) or less having MD and TD tensile strengths both above 20,000 psi (137.93 Mpa). Moreover, percent elongation of BOPP films at break can be above 100% in MD and above 40% in TD, making them attractive replacements for cellophane. As a result, cellophane has been replaced by BOPP for the packaging of many items such as cigarettes, small candies, cigars, and in other clear overwrap packaging markets.

The teachings of U.S. Pat. No. 2,949,757 discussed above do not solve the orientation limitations of cellophane in view of the perceived limitation of 55% as the upper limit of transverse stretch. For example, the teaching of this patent is embodied in a tubular film for food casings sold by Viskase Corporation under its trademark NOJAX. These films have an MD tensile strength (wet) on the order of about 4.18 lbs/in·mil and a TD tensile strength on the order of about 3.15 lb/in·mil. While this is a relatively balanced structure, the TD tensile strength is well below that of BOPP. Accordingly, even if this tube were slit to form flat sheets, its dry tensile properties and thickness should not compete favorably with BOPP.

Inflating beyond the upper limit of 55% suggested by the '757 Patent, may improve TD tensile properties but is difficult to accomplish on a commercial scale and compromises other film properties as noted above.

Attempts have been made to improve the biorientation of cellophane and therefore the balance of MD/TD tensile properties. For example, U.S. Pat. No. 3,280,234 discloses a method for producing a cellulose film with similar MD and TD tensile properties. The method involves producing viscose and extruding it as a tube directly into an acid bath without passing through air. In the acid bath the pressure within the extruded tube is slightly elevated, immediately expanding the extruded tube from 1.5 to 3 times the extruded diameter. Also, the tube is pulled through the bath at a rate that stretches it in the machine direction from 1.5 to 3 times its extruded dimension. The cellulose, which is partly regenerated in the acid bath, then is removed from the acid bath and expanded an additional 20% to 50%. The expanded tube then is slit into flat sheets. These sheets pass through additional baths to complete the regeneration and then the film is dried. The result is a viscose cellulose film having a dry thickness of from one mil (0.0254 mm) down to about 0.6 mil (0.152 mm) with MD and TD tensile strengths of up to 21,200 psi (146.2 Mpa). Evidently this process has not produced a commercially viable product because such cellophane film apparently has not regained market share from BOPP.

Even though cellulose is relatively inexpensive, the resulting viscose cellulose film on a per pound basis is still relatively expensive as compared to BOPP. This is due to the specific gravity differences between cellulose (typically 1.4 to 1.6) and BOPP (typically 0.9 to 1.0). A further disadvantage of cellophane production utilizing the viscose process is the liberation of sulfur compounds during regeneration as described above. The evolution of these gaseous by-products causes bubbles to form within the cellulose film as it regenerating and weakens it so that breakage occurs when stretching to orient the film. This is particularly the case as the film thickness decreases so that currently, cellophane film is usually at least about one mil thick.

Thus, given the low cost of cellulose, it should be appreciated that an improvement in the biorientation of a cellulose film which has a dry thickness of less than one mil, could offset somewhat the commercial advantages enjoyed by BOPP.

Accordingly, another object of the present invention is to provide an improved method for forming a cellophane film with balanced MD and TD orientation, and with a dry strength that is comparable to polypropylene film.

SUMMARY OF THE INVENTION

The present invention provides a practical method for the manufacture of a tubular cellulosic film having relatively high MD and TD tensile strength coupled with a relatively balanced orientation. The invention further provides a cellulose film which is characterized by a high retained value of work-to-rupture. For purposes of this invention, work-to-rupture (WTR) is defined generally as the product of tensile strength times the elongation at break. Thus, WTR is, in effect, a measure of the work required to cause the film to break. The transverse direction WTR values or $WTR_{TD}$ are particularly significant for purposes of the present invention because these values are related to the inflation of a tubular film during drying.

Retained work-to-rupture also is an important consideration in the context of the present application. This value represents the change effected by an increase in the TD (or MD) orientation of a tubular film of a given diameter. Increasing the TD orientation may serve to increase tensile strength while decreasing the amount of elongation at break. The $WTR_{TD}$ after orientation generally is something less than that of the original film. Thus, the slope of a line representing the percent of retained $WTR_{TD}$ generally is a negative value. Nevertheless, the retained $WTR_{TD}$, expressed as a percent of the original value (i.e., prior to TDO increase) is a convenient measure both of the ability of the film to orient and the properties retained after orientation.

It has been found that with a tubular film formed according to the method of the present invention, the slope of a line representing the percent of retained $WTR_{TD}$ is greater than that for prior art tubular viscose cellulose films. The result is that a tubular film according to the present invention can undergo a relatively high TD orientation and still retain desirable properties of both tensile strength and elongation.

In the context of the present invention, this is accomplished by a method of forming a seamless cellulose tubular film of nonderivatized cellulose, comprising the steps of:

a) extruding a solution of nonderivatized cellulose, tertiary amine N-oxide cellulose solvent and water as a tube through an air gap and into a nonsolvent bath while internally cooling the tube in the air gap;

b) removing the tertiary amine N-oxide solvent from the extruded tube to form a substantially solvent-free wet tube of nonderivatized cellulose having a substantially uniform first diameter; and c) inflating said wet tube to a second larger diameter and maintaining said second larger diameter while drying said wet tube such that the resulting seamless cellulose tubular film
  i) has a dry flat width at least 55% to about 200% greater than the flat width of said wet tube and
  ii) retains a greater percentage of work-to-rupture than a comparable viscose cellulose tubular film subjected to the same drying conditions.

The significant inflation or expansion of the wet tube during drying so that after drying the tube has a diameter at least 55% and up to about 200% greater than the wet tube diameter provides a significant level of improvement in biorientation. It also results in retained $WTR_{TD}$ characteristics not achievable with tubing produced by the viscose method. The dry tubing so produced can be slit and formed into relatively thin sheets of cellophane film with balanced MD/TD properties in the dry state.

DESCRIPTION OF THE DRAWINGS

FIG. 2 is a graph showing the relative loss of $WTR_{TD}$ of both NMMO cellulose and viscose cellulose tubing.

DETAILED DESCRIPTION OF THE INVENTION

Figure 1:
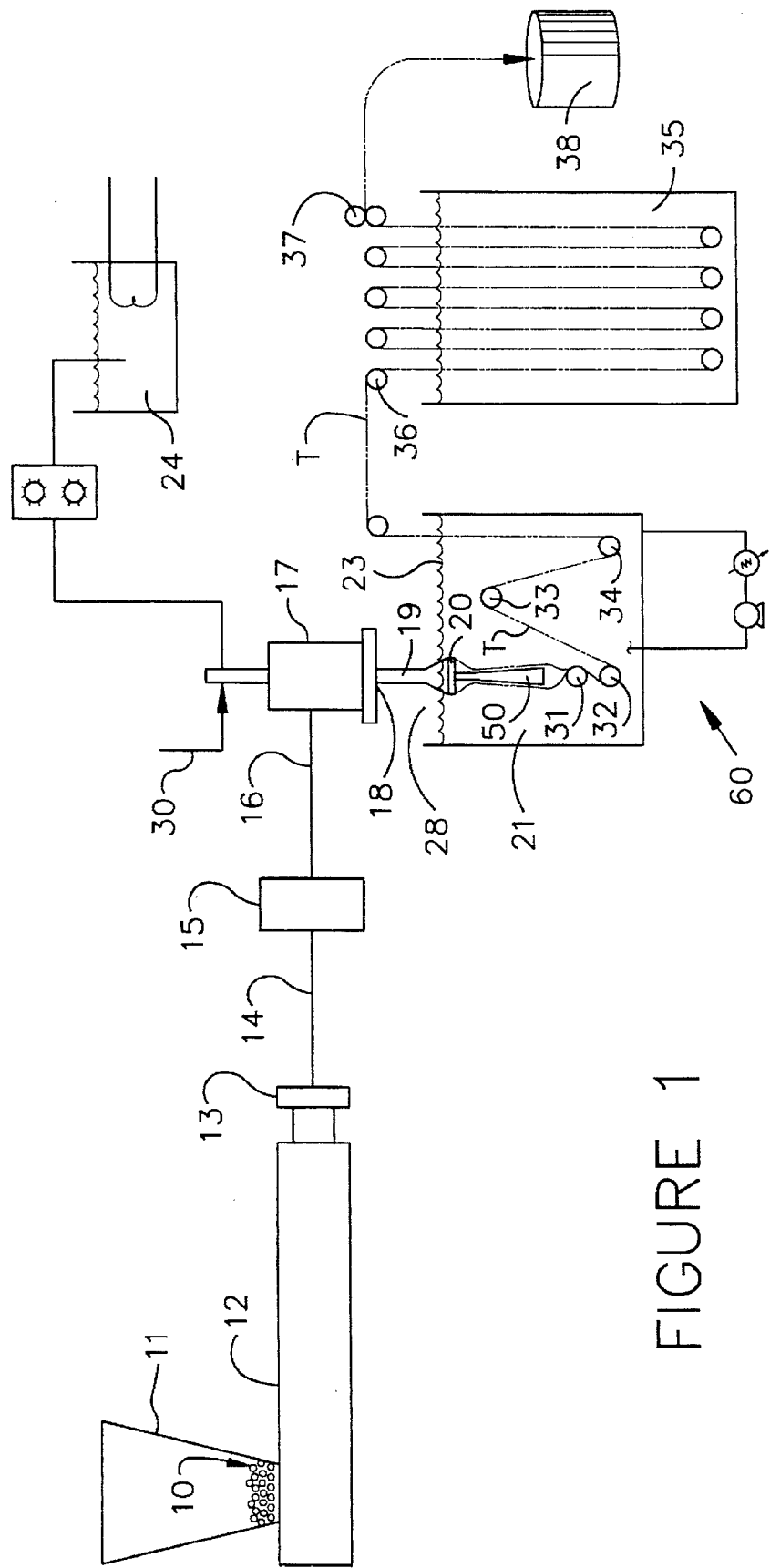
FIG. 1 is a schematic flowsheet showing an arrangement to manufacture the NMMO cellulose food casing.

In all of the tests described herein, the starting material was a "dope" in the form of a yellow/brown solid having a melting point of 60°–70° C., obtained from Courtaulds Research Ltd., Coventry, England. The Material Safety Data Sheet for the dope identifies it as containing by weight, 70–80% NMMO, 10–20% cellulose and 5–15% water. It is believed the dope as supplied is made according to processes described in U.S. Pat. Nos. 4,145,532; 4,196,282, and 4,255,300, the disclosures of which are incorporated herein by reference. The dope, received as slabs, was ground to a particle size of less than about 1.58 mm, i.e., ⅛ inch, in diameter.

Referring to the drawings, FIG. 1 shows the apparatus as may be used in the method of the present invention. This apparatus is more particularly described in copending application Ser. No. 08/179,418 filed Jan. 10, 1994 now U.S. Pat. No. 5,451,364, the disclosure of which is incorporated herein by reference. It is sufficient for purposes of the present invention to say that the apparatus includes an extruder 12 having a screen pack section 13. A heated pump 15 downstream of the extruder is connected to an extrusion die 17 arranged for downward extrusion. The extrusion die has an annular orifice 18 disposed above the level 23 of a nonsolvent liquid bath 21. An elongated mandrel 19 depends from the extrusion die such that the lower end 20 of the mandrel is disposed below the liquid level 23. Various mandrel forms as disclosed in U.S. Pat. No. 5,451,364 may be used. A preferred mandrel is one which allows the air gap 28 to be 6 inches (15.24 cm) to 12 inches (30.48 cm) long. Moreover, a blade-like structure 50 depending from the lower end of the mandrel helps to flatten the tubular extrusion T so it can be transported through the system.

Air can be introduced into the mandrel 19 through a line 30 in order to facilitate start-up for the initial drawing of an extruded tube along the mandrel and over its lower end 20. Likewise, an internal bath of nonsolvent liquid is introduced through the mandrel and into the extruded tube. The internal bath is introduced from a supply container 24 and preferably this internal bath is cooled to between about 30° F. and 60° F.

A second bath 35 sits adjacent the first bath 21 and suitable rollers 31–34 and 36 are provided to permit passage of an extruded tube in a flattened condition through and between each bath.

Briefly, in operation, ground dope particles 10 are fed through funnel 11 to extruder 12 which heats the dope to a temperature in the range of from about 200° F. to about 240° F.

The extruded dope is flowed through screen pack section 13 to remove any particulate matter from the molten dope stream.

The fully molten dope is flowed through an electrically heated conduit 14 to heated melt pump 15. The molten dope discharged from melt pump 15 flows through conduit 16 to die assembly 17. The molten dope is downwardly extruded through die assembly 17 and is discharged from annular orifice 18 to form a seamless tube T.

The extruded tube T moves downwardly and passes over the outer surface of mandrel 19 having enlarged lower end 20, and into first bath 21 of a nonsolvent liquid, for example, water.

The extruded tube T preferably is drawn from the extrusion orifice in part by the action of rolls 31–34 at a rate of about three times the extrusion rate. This drawing action thins the extruded wall structure and provides some degree of MD orientation to the cellulose in the extruded tube.

One function of first bath 21 comprising nonsolvent liquid is to harden the extruded tube T by densifying and regenerating the cellulose. The bath also draws out NMMO from immersed tube T so that a tube leaving the first bath comprises essentially pure cellulose. It has been experimentally determined that the presence of limited concentrations of NMMO in first bath 21 improves the tensile strength properties of tube T, although concentrations above 50 wt. % adversely affect these properties. Accordingly, a preferred concentration of NMMO in first bath is between about 15 and about 50 wt. %, with water comprising the balance.

For details of the structure of the die assembly 17 and mandrel 19, reference is made to U.S. Pat. No. 5,451,364. Further, as disclosed in said patent, the air gap length 28 between the extrusion orifice 18 and the liquid level 23 of the first bath 21 was found to be important for the development of TD tensile strength.

As noted above, drawing the extruded tube from the extrusion orifice 18 provides MD orientation and consequently an improved MD tensile strength. However, it was unexpectedly found that when this air path length is increased from a relatively short distance as, for example, 50 mm (1.97 inches) to at least about 152.4 mm (6 inches), and up to about 304.8 mm (12 inches), the TD tensile strength of the resulting cellulose substantially increases and approaches the MD strength of the tube, so that the MD/TD tensile strength ratio preferably does not exceed about 2 and most preferably does not exceed about 1.5.

A possible explanation for this is that the increase in air path length allows the falling stream of dope to cool and to transition into a liquid crystalline phase, often called a mesophase. It is known in the art that parameters controlling this transition include cellulose concentration, cellulose molecular weight, solvent proportions and temperature. That is, a solution of cellulose in a NMMO-water solution can be cooled to a point where the mesophasic transition begins to occur, as shown by the formation of increased structure in the solutions when observed under a polarized light microscope. Additionally, it is known that a small diameter fiber drawn and regenerated from this mesophasic mixture has an x-ray powder diagram comparable to that of an otherwise identical cellulose fiber from the viscose process which has been subjected to mechanical orientation during the regeneration process. This suggests that in making the transition to the mesophase or liquid crystalline state by the method of this invention, crystalline structure is imparted that is carried over into the finished article even with only limited mechanical orientation. This structure includes high transverse direction tensile strength that approximately matches the high machine direction tensile strength, i.e., a high and biaxially balanced tensile strength cellulose tube.

As used herein, all cellulose tensile strengths, unless otherwise noted, are measured "wet" which is usually a more stringent test than "dry" tensile strength. For this measurement, the tube sample is first immersed in tap water at room temperature for 20 minutes before the tensile strength measurement. The test is performed on an Instron Table Model Tensile Testing Machine (or equivalent) of the constant rate-of-jaw separation type using a method derived from ASTM D-882. The specific procedure is as follows:

1.) Cut six samples 2 inches long machine direction (MD)×1 inch long tensile direction (TD), and identify as MD.

2.) Cut six samples 1 inch long MD×greater than 1 inch long TD, and identify as TD.

3.) Measure thickness of samples with a micrometer having a range up to 0.1 inch and accuracy of 0.001 inch, basing measurement on minimum thickness (the weakest point).

4.) Soak samples in room temperature water for 20 minutes if wet properties are desired. Skip this step if dry properties are being obtained.

5.) Measure flat width of wet samples as well as their thickness in the same manners as 3.).

6.) Set the Testing Machine crosshead speed and the chart speed at 20 inches/minute.

7.) Set the gauge length at 1 inch and zero the pen.

8.) Calibrate the Testing Machine to a full scale load of 25 lbs.

9.) Clamp the specimen squarely between the jaws.

10.) Run the crosshead down until the specimen ruptures.

11.) Calculate the specimen tensile strength in lbs/inch·mil thickness in accordance with the following formula:

$$\text{tensile strength} = \frac{\text{Force (lbs)}}{\text{width (in.)} \times \text{thickness}}$$

where:

Force=No. from chart at sample rupture
Width=Sample width (1 inch)
Thickness=Sample gauge (1 mils)

12.) Calculate the arithmetic average of six tensile strength readings for MD and the six readings for TD. These are the values reported in Tables A and B.

The improved TD tensile strength related to the so called "long air gap" method as described above were achieved while drying the regenerated tubular structure under pressure sufficient only to hold the tube open. However, it now has been found that still further improvements in TD tensile strength can be obtained by drying the tubes under inflating pressures sufficient to significantly expand the tube. The gel tubes of NMMO cellulose could be inflated to a much higher degree without excessive breakage than their viscose cellulose counterparts producing a thinner wall and without significant loss of physical properties.

In view of the prior art such as the '757 Patent noted above, drying under such inflation pressures was anticipated to improve TD tensile strength. However, it was unexpectedly found that tubes of NMMO cellulose were able to be transversely oriented to a much higher degree than cellulose tubes made with the conventional viscose process. That is, much larger inflation diameters were obtainable with the nonderivatized cellulose tube than with conventional tubes regenerated from a derivatized cellulose as was made using the viscose process. In this regard, surprising inflation even up to a diameter of 140% or more greater than the wet tube diameter were obtained so that a film with significant retained $WTR_{TD}$ relative to the original sample could be produced.

A still further surprising discovery is that the tube of NMMO cellulose, even after such high orientation, retained a greater percentage of work-to-rupture than a comparable tube of viscose cellulose. This means the tubular film, even after a high degree of TD orientation, retains desirable properties. Expressed differently, this means that the properties of a tubular film of NMMO cellulose are less effected by high levels of orientation than those of a comparable derivatized cellulose tube.

For purposes of inflating the wet tube, it is pulled from the second bath 35 (FIG. 1) by driven nip rolls 37 and passed directly into a dryer (not shown) which is well known in the art. Such a dryer, as shown for example in U.S. Pat. No. 2,901,358, is an elongated heated chamber. Nip rolls at the chamber ends serve to trap an air bubble within the wet tube. It is the pressure of this air bubble that determines the expanded diameter of the dried tube 38. Excessively inflating a wet NMMO cellulose tube while drying it, imparts a high transverse direction orientation (TDO). This produces a more balanced casing as regards its TD and MD strengths. By balanced, we mean that the MD and TD tensiles are similar rather than that the strength orientation be substantially greater in only one direction.

The single most striking improvement that occurs when the wet NMMO cellulose tubing is inflated during drying is that the elongation of the dried tubing is reduced and the tensile strength is increased. This also happens with viscose cellulose tubing. However, in this case the retained $WTR_{TD}$ of the viscose cellulose is not as great a percentage of the original sample as it is for NMMO cellulose tubing. This is particularly true when the TDO of the viscose cellulose is increased to greater than the 55% limit suggested by U.S. Pat. No. 2,999,757.

Using this improvement, the TDO of tubing made from a NMMO cellulose can be increased by as much as 140% with the retention of substantial amounts of the original $WTR_{TD}$. This is not true for casing made from viscose, which loses relative $WTR_{TD}$ rapidly as the TDO increases to greater than 55%. This is important because of the greater flexibility that the present invention allows relative to similar operations for the viscose process and, most importantly, because it enables a highly bioriented cellulose film to be made without significant loss in the ability of the film to retain useful properties as measured by the percent of the retained work-to-rupture value.

As will be further shown, this allows production of a highly bioriented thin cellulose film which compares favorably with films made of BOPP, a thermoplastic resin, relative to MD and TD strength properties. It is superior to currently manufactured viscose cellophanes in the fact that its tensile strength can be easily adjusted and to a greater degree than is possible with current commercial cellophanes and in that it can be manufactured at about one-half the thickness of current cellophanes.

The desired effect, that is, the relatively higher retained ability of the tubing or film, after orientation, to absorb useful work (e.g., resist stress), compared to viscose cellulose tubes, can be described mathematically as the comparison of the slope of a line relating the WTR parameter before and after the expansion of the casing as it is dried at various TDO levels. Thus, the invention encompasses a method for the production of a nonderivatized cellulose tubular film which imparts to the film the property that the slope of the retained, $WTR_{TD}$ as the percent of TDO increases, plotted against the percent of TDO, is greater than that for the same dryer inflation and mathematical treatment of a viscose cellulose tubular film.

The value ($R_{TD}$) for the percent retained WTR in the TD direction for any given percent of increase of the TDO (i.e., diameter increase) is calculated as:

$$R_{TD} = \frac{WTR @ X_2}{WTR @ X_1} \times 100$$

where $X_1=0\%$ or initial % TDO and $X_2>X_1$

The slope of a line representing values of $R_{TD}$ as the percent of TDO increases is $$Slope = \frac{R_{TD} - 100}{X_2 - X_1}$$

One method of practicing this invention is by inflating the wet cellulose tube during the drying step so that the diameter of the dried tube is from 55% to about 140% greater than the diameter of the wet tube. It was highly unexpected that such superinflation of the tubing or casing could be done, much less also retain a useful balance of TD tensile strength and resistance to elongations. This is because the teachings in the viscose casing art, i.e., U.S. Pat. No. 2,999,757, is that viscose cellulose casing can only be inflated and dried to a maximum of about up to 55% greater than its wet diameter before losing its ability to retain a useful balance of TD tensile and elongation properties. This fact indicates that the $WTR_{TD}$ of a viscose cellulose casing decreases rapidly above about 55% inflation. On the other hand, a nonderivatized cellulose tubing or casing made with the method of the present invention retains a useful balance of TD tensile stress and elongation properties over a much larger range of TDO.

The superinflation of the nonderivatized casing provides a method of essentially transferring MD strength to the TD, while reducing the TD elongation to a level that is commercially viable.

In order to practice this invention in the best possible mode, a number of other variables beside inflation should also be controlled. In particular, during the manufacture of the tubing, the air gap 28 between the extrusion orifice 18 and the surface of the first bath is important. It has been observed that the bath level within the extruded tube is slightly higher than bath level 23. Accordingly, the air gap length as referenced hereafter (unless otherwise distinguished) is an average of the internal and external lengths. Accordingly, it has been found that the air gap should range from about 4–12", with the preferred range being about 5–11", and the most preferred being about 5–10". The concentration of NMMO in the internal bath delivered through the mandrel to the inside of the extruded tube can range from about 10–50% by wt., with a preferred range being from about 15–40% by wt., and the most preferred range being about 25–35% by wt. The temperature of the first bath 21 should range from about 30° to about 100° F., preferably to about 35° to 90° F., and most preferably about 40° to 50° F. The concentration of NMMO in the first bath can range from about 0–30% by wt., preferably about 8–22%, and most preferably about 11–19% by wt. The temperature of the second bath 35 should range from about 130°–190° F., preferably from about 140°–180° F., and, most preferably, from about 150°–180° F.

The range of TDO is such that the dry tube diameter is from about 60% to about 200% greater than the wet tube diameter, with a preferred range up to about 160%, and a most preferable range of up to about 140%. The applicants believe that the manufacture of tubular film of NMMO cellulose within these parameters will produce a commercially acceptable product. These ranges are believed to be acceptable ranges on the equipment used by the applicants, and also give guidelines to practitioners skilled in this art for the use of this invention on other equipment.

The experiments to confirm the relationships encompassing the salient features of the present invention were done by currently well accepted methods of statistical experimental design. This is a method whereby multivariate systems are studied using multiple factor experimentation coupled with statistical analysis of the data to obtain equations that relate the dependent and independent variables. A partial experimental design matrix of 5 variables, 2 levels each was designed and is shown in Table A.

The variables are u, v, w, x and y and the levels are "+" (high) and "−" (low). By way of illustration, in Experiment No. 2 in Table A the variables u and y would be held at the preselected "low" level and v, w, and x would be held at the preselected "high" levels for those variables.

TABLE A

EXPERIMENTAL DESIGN

| Exp. No. | u | v | w | x | y |
|---|---|---|---|---|---|
| 1 | + | + | + | + | + |
| 2 | − | + | + | + | − |
| 3 | + | − | + | + | − |
| 4 | − | − | + | + | + |
| 5 | + | + | − | + | − |
| 6 | − | + | − | + | + |
| 7 | + | − | − | + | + |
| 8 | − | − | − | + | − |
| 9 | + | + | + | − | − |
| 10 | − | + | + | − | + |
| 11 | + | − | + | − | + |
| 12 | − | − | + | − | − |
| 13 | + | + | − | − | + |
| 14 | − | + | − | − | − |
| 15 | + | − | − | − | − |
| 16 | − | − | − | − | + |

EXAMPLE 1

Table B shows the operating parameters for nineteen (19) extrusion experiments. The five variables for each of these experiments are:

u=air gap in inches
v=1st bath % NMMO
w=1st bath temp in deg. F.
x=2nd bath temp in deg. F.
y=internal bath % NMMO The tubing resulting from each of these experiments were subjected to two different transverse direction orientations (z) giving a total of thirty-eight (38) sets of data. The data from these thirty-eight (38) experiments were modelled using the SAS program. This allowed for analysis of variance (ANOVA) by using computer assistance to estimate the coefficients for a modelled equation relating the transverse direction WTR to the independent variables.

From the foregoing, the equation for work-to-rupture in the transverse direction as modelled from the real experimental data is:

Equation 1:

$$WTR_{TD} = 4009.295516 + 119.374092u - 94.801177v -$$
$$23.797478w - 10.516180x - 1562.002030z + 1.214650uv -$$
$$0.916488ux + 0.506601vw + 0.317316vx + 6.555655wz +$$
$$6.340762xz$$

TABLE B

MATRIX WITH ACTUAL WTR DATA

| SAMPLE | U<br>AIR GAP | V<br>1ST BATH<br>% NMMO | W<br>1ST BATH<br>TEMP | X<br>2ND BATH<br>TEMP | Y<br>INT BATH<br>% NMMO | Z<br>TDO | MD<br>TENS. | % EL | TD<br>TENS. | % EL | TD<br>WTR |
|---|---|---|---|---|---|---|---|---|---|---|---|
| 17A | 6.7 | 15 | 80.7 | 150 | 40 | — | — | — | — | — | — |
| 17B | 6.7 | 15 | 80.7 | 150 | 40 | 1.95 | 3.48 | 47 | 2.51 | 106 | 266 |
| 5A | 2.7 | 10 | 95.8 | 138 | 30 | 1.65 | 35.3 | 48 | 1.51 | 114 | 172 |
| 5B | 2.7 | 10 | 95.8 | 138 | 30 | 1.87 | 3.24 | 52 | 2.1 | 101 | 212 |
| 6A | 9.1 | 10 | 95 | 135 | 56 | 1.47 | 2.89 | 49 | 2.13 | 127 | 271 |
| 6B | 9.1 | 10 | 95 | 135 | 56 | 1.71 | 2.75 | 53 | 1.94 | 89 | 173 |
| 14A | 9.1 | 10 | 95.6 | 158 | 30 | 1.64 | — | — | — | — | — |
| 14B | 9.1 | 10 | 95.6 | 158 | 30 | 1.85 | — | — | — | — | — |
| 13A | 3 | 10 | 94 | 159 | 56 | 1.62 | 2.43 | 37 | 1.81 | 104 | 188 |
| 13B | 3 | 10 | 94 | 159 | 56 | 1.79 | 2.47 | 37 | 1.98 | 102 | 202 |
| 1A | 2.6 | 10 | 68 | 137.2 | 56 | 1.58 | 4.13 | 41 | 2.46 | 171 | 421 |
| 1B | 2.6 | 10 | 68 | 137.2 | 56 | 1.86 | 3.23 | 37 | 2.11 | 127 | 268 |
| 9A | 2.7 | 10 | 64.8 | 163.8 | 30 | 1.63 | — | — | — | — | — |
| 9B | 2.7 | 10 | 64.8 | 163.8 | 30 | 1.76 | 4.55 | 47 | 2.44 | 186 | 454 |
| 10A | 9.3 | 9.8 | 64 | 159.2 | 56 | 1.91 | 3.05 | 50 | 2.54 | 123 | 312 |
| 10B | 9.3 | 9.8 | 64 | 159.2 | 56 | 2.1 | 3.31 | 54 | 3.08 | 89 | 274 |
| 2A | 9.2 | 10.5 | 64 | 136 | 30 | 1.89 | 3.74 | 69 | 3.27 | 121 | 396 |
| 2B | 9.2 | 10.5 | 64 | 136 | 30 | 2.07 | 3.68 | 67 | 3.35 | 116 | 398 |
| 18A | 6 | 15 | 81 | 150 | 40 | 1.37 | 3.35 | 50 | 1.7 | 148 | 252 |
| 18B | 6 | 15 | 81 | 150 | 40 | 2.06 | 3.18 | 54 | 2.37 | 70 | 166 |
| 7A | 2.9 | 20 | 95.8 | 138.7 | 56 | 1.51 | 2.66 | 41 | 1.2 | 97 | 116 |
| 7B | 2.9 | 20 | 95.8 | 138.7 | 56 | 1.92 | 2.58 | 44 | 2.19 | 89 | 195 |
| 8A | 9.2 | 20 | 96.2 | 135 | 30 | 1.57 | 3.56 | 59 | 2.73 | 144 | 393 |
| 8B | 9.2 | 20 | 96.2 | 135 | 30 | 1.76 | 3.34 | 68 | 2.1 | 110 | 231 |
| 16A | 9.5 | 20 | 94 | 162 | 59 | 1.56 | 2.58 | 51 | 2.17 | 128 | 278 |
| 16B | 9.5 | 20 | 94 | 162 | 59 | 1.99 | 2.44 | 52 | 2.76 | 100 | 276 |
| 15A | 2.8 | 20 | 95 | 166 | 30 | 1.37 | 3.38 | 51 | 1.56 | 147 | 229 |
| 15B | 2.8 | 20 | 95 | 166 | 30 | 1.89 | 3.14 | 52 | 2.92 | 111 | 324 |
| 3A | 2.7 | 20 | 69.9 | 135 | 30 | 1.33 | 4.32 | 52 | 1.93 | 170 | 328 |
| 3B | 2.7 | 20 | 69.9 | 135 | 30 | 1.84 | 3.94 | 54 | 2.32 | 110 | 255 |
| 11A | 2.8 | 20 | 67 | 162 | 56 | 1.59 | 3.16 | 38 | 2.16 | 184 | 397 |
| 11B | 2.8 | 20 | 67 | 162 | 56 | 2.19 | 3.16 | 42 | 2.9 | 99 | 287 |
| 4A | 9.1 | 20 | 64.8 | 136.2 | 56 | 1.38 | 3.18 | 49 | — | 85 | — |
| 4B | 9.1 | 20 | 64.8 | 136.2 | 56 | 1.71 | 2.79 | 43 | 2.54 | 126 | 320 |
| 12A | 9 | 20 | 65 | 164 | 30 | 1.56 | 3.41 | 58 | 2.17 | 139 | 302 |
| 12B | 9 | 20 | 65 | 164 | 30 | 2.08 | 3.65 | 61 | 2.96 | 100 | 296 |

TABLE B-continued

MATRIX WITH ACTUAL WTR DATA

| SAMPLE | U AIR GAP | V 1ST BATH % NMMO | W 1ST BATH TEMP | X 2ND BATH TEMP | Y INT BATH % NMMO | Z TDO | MD TENS. | MD % EL | TD TENS. | TD % EL | TD WTR |
|---|---|---|---|---|---|---|---|---|---|---|---|
| 19A | 6.2 | 15 | 79.9 | 149.6 | 40 | 1.58 | 3.36 | 55 | 2.28 | 140 | 319 |
| 19B | 6.2 | 15 | 79.9 | 149.6 | 40 | 1.99 | 3.35 | 54 | 2.45 | 93 | 228 |

The tensile strengths reported in Table B are taken wet in units of pounds per inch width per mil thickness. Examination of Equation 1 shows that the variable "y" (internal bath % NMMO) does not appear. This means that in the range of "y" which was tested (about 30–60% NMMO), the internal bath NMMO concentration does not impact the resulting $WTR_{TD}$.

Equation 1, thus derived from actual experimental data, was used to calculate the results of hypothetical experimental conditions that held all variables constant except for the variables of interest. These are the computer generated modelled extrusion of Example 2.

EXAMPLE 2

Using Equation 1, a number of simulated experiments were run by computer generation. These experiments and the parameters under which the experiments were run are shown in Table C. In all runs, the range of y was taken to be between about 30–60% NMMO which according to Equation 1, should not materially influence the test result. For this reason, the variable "y" does not appear in Table C.

Also, for purposes of the computer simulated tests, two different transverse orientations (z) were used, one at 0% and one at 140% greater than the original tube diameter. Using Equation 1, this obtained for each test at given conditions, a $WTR_{TD}$ value at 0% TDO and a second value at 140% TDO from which a ratio of retained $WTR_{TD}$ can be calculated.

Moreover, with two values of $WTR_{TD}$, it is possible to obtain a value for the slope of a line which relates the percent of TDO increase to the value of retained $WTR_{TD}$. The calculation for this slope value at the 140% orientation value becomes $$slope = \frac{100\% [R_{TD}] - 100\%}{140\%}$$

where $R_{TD} = \frac{WTR_{TD} @ 140\% \, TDO}{WTR_{TD} @ 140\% \, TDO}$

For example, using the value from test #1 in Table C the slope can be computed as follows:

$$slope = \frac{100\% [298/695] - 100\%}{140} = 0.408$$

TABLE C

COMPARISON OF SLOPE OF % TDO TO RETAINED WTR-TD

| Sample NMMO Tubing | U | V | W | X | $WTR_{TD}$ 0% TDO | $WTR_{TD}$ 140% TDO | Slope |
|---|---|---|---|---|---|---|---|
| 1 | 5 | 11 | 50 | 150 | 695 | 298 | −0.408 |
| 2 | 5 | 11 | 50 | 180 | 537 | 407 | −0.171 |
| 3 | 5 | 11 | 80 | 150 | 344 | 224 | −0.250 |
| 4 | 5 | 11 | 80 | 180 | 186 | 332 | +0.557 |
| 5 | 5 | 19 | 50 | 150 | 568 | 172 | −0.500 |
| 6 | 5 | 19 | 50 | 180 | 486 | 356 | −0.193 |
| 7 | 5 | 19 | 80 | 150 | 340 | 219 | −0.250 |
| 8 | 5 | 19 | 80 | 180 | 258 | 403 | +0.400 |
| 9 | 10 | 11 | 50 | 150 | 671 | 275 | −0.421 |
| 10 | 10 | 11 | 50 | 180 | 375 | 245 | −0.250 |
| 11 | 10 | 11 | 80 | 150 | 321 | 200 | −0.271 |
| 12 | 10 | 11 | 80 | 180 | 25 | 171 | +4.17 |
| 13 | 10 | 19 | 50 | 150 | 593 | 197 | −0.479 |
| 14 | 10 | 19 | 80 | 180 | 374 | 244 | −0.250 |
| 15 | 10 | 19 | 50 | 150 | 365 | 244 | −0.236 |
| 16 | 10 | 19 | 80 | 180 | 145 | 294 | +0.714 |

Table C shows that for an air gap (u) in the range of 5–10 inches, a first bath NMMO concentration (v) of 11–19% and temperature (w) of 50°–80° F. and a second bath temperature (x) in the range of 150°–180° F. the ratio of retained $WTR_{TD}$ at a TDO of 140% remained relatively high. The slope of a line representing the retained $WTR_{TD}$ in some cases was positive indicating that under certain conditions, the $WTR_{TD}$ after orientation was greater than before orientation.

However, in most cases the slope is negative as expected. What is surprising and unexpected is that throughout the range of values (−0.500 to +4.17) this slope is greater than that of a comparable viscose cellulose tubular film as further set out below.

EXAMPLE 3—COMPARATIVE EXAMPLE

For comparison purposes, a viscose cellulose tubing was prepared using a process currently employed to produce a commercial tubular cellulose film sold as NOJAX® food casing by Viskase Corporation. After extrusion and regeneration of the viscose cellulose tubing in a conventional manner, 8–10 foot lengths of the gel stock were inflated to various pressures and dried at about 60°–80° C. After drying, the flat width of each tubing was measured which allowed calculation of the percent of transverse orientation using the equation 100 [(DFW/WFW)−1].

Thus, if the gel stock used had a WFW of 1.0625" and if the DFW were 1.65", the TDO would be 55.2%. The experimental data showing TDO and retained $WTR_{TD}$ is shown in Table D.

TABLE D

CONTROL VISCOSE CELLULOSE TUBING

| Sample No. | % TDO | Retained WTR$_{TD}$ |
|---|---|---|
| 1 | −5.88 | 100 |
| 2 | 12.00 | 73 |
| 3 | 16.71 | 77 |
| 4 | 22.36 | 54 |
| 5 | 27.06 | 78 |
| 6 | 44.94 | 52 |
| 7 | 55.29 | 36 |
| 8 | 64.71 | 41 |

This data was regressed to give a straight line with the equation: Retained WTR$_{TD}$=−0.8357 TDO+88.65.

Thus, for comparison purposes, viscose cellulose tubular film, as may be used for food casing has a retained WTR$_{TD}$ slope value of about −0.836 whereas a comparable product of NMMO cellulose has a greater retained WTR$_m$ slope value. This means that at high rates of transverse orientation, the resulting NMMO cellulose article is stronger in terms of work to rupture (tensile stress x% elongation) than a comparable viscose cellulose article.

FIG. 2 shows a comparison of the slopes of the lines relating % TDO to retained WTR$_{TD}$ for viscose cellulose tubular film casing (regressed value−0.836) and for an inventive NMMO cellulose tubular film casing of Example 1 in Table C.

Another article that can be made using the inventive method is cellulose film or cellophane.

As described earlier, cellophane is commercially produced by the viscose method. The viscose, once prepared and deaerated, is cast from a slot die. The die is kept below the surface of the acid bath, similar to casing extrusion. Regeneration and washing remove the soluble by-products in the water wash. The gel obtained is then plasticized and dried.

Drying is done on supported heated drums. The natural tendency of the film is to shrink as the moisture is removed down to the nominal 10% range. If shrinkage is not inhibited in the transmachine direction, the thickness increases and the width decreases. Most cellophane producers minimize this shrinkage by mechanically tentering or physically holding the film edges by means of a series of grippers as it is dried. This cellophane has a thickness of from about 0.7 to about 1.7 mil., with a dry MD tensile strength of around 18,000 lbs. per square inch ("PSI"), and a dry TD tensile strength of around 8,000 PSI. The strength of this film is in the machine direction, with the transverse direction having only 44% of the strength of the machine direction.

In the present invention, cellophane can be made as an extruded tube from the dope material, generally as described above for tubing or casing manufacture. During drying, it is inflated so the dry flat width (DFW) of the tubing is in the range of from about 155% to about 240% of the original wet flat width ("WFW"), preferably from about 180% to about 220%, and then slit to form a sheet. The inventive cellophane made of NMMO cellulose for Examples 4 and 5 below had thicknesses of 0.5−0.65 mil. Moreover, the dry tensile strengths of these films were nearly balanced in the machine and cross-machine or transverse directions.

This film can be made competitive with BOPP film. As stated above, BOPP, a thermoplastic film, can be made with a thickness of about 0.8 mils while having a balanced MD/TD ratio. Using the present inventive method, a cellophane of NMMO cellulose can be produced at a minimum thickness of about 0.3 mils while having a balanced MD/TD ratio.

EXAMPLE 4

Comparison of NMMO Cellulose Cellophane Film And Viscose Cellulose Cellophane Film In this Example 4, nonderivatized cellulose tubing was produced as generally described above with reference to FIG. 1. In this case, the outer diameter of the die was 0.6" and the inner diameter was 0.5". The die gap of orifice 18 was 50 mils, and the output through the air was 35 lbs. of dope per hour. The mandrel diameter was 0.90", the air path length was 9" and the draw ratio was 4.55. In addition, the first bath temperature was 45° F. and contained 10% NMMO in water. A counter current wash system that used 150° F. water to remove solvent from the casing was placed between the first two baths. The casing was stretched as it passed through the first bath and the wash system. The second bath was followed by a 10% glycerine/water solution at 150° F.

All samples were extruded using a four spiral die having a mandrel generally as described in U.S. Pat. No. 5,451,364. The larger diameter lower end section 20 of the mandrel was had a diameter of 0.910". The blade 50 was removed and instead, after the tube left the lower end 20 of the mandrel, the tube was passed around a series of four horizontal rods to flatten the casing.

The tubing samples were dried under inflation to levels ranging from 195% to 235% of the wet diameter. These tubes were then slit to form a sheet. The properties of the cellophane film made of the NMMO cellulose according to the method of the present invention are shown in Table E below.

Also shown in Table E are properties of cellophane produced from viscose cellulose. These properties are Technology, 1986. Properties are given for uncoated cellophanes, cellophanes coated with nitrocellulose that are both heat sealable and nonheat sealable, and cellophane coated with a polyvinylidene chloride ("PVDC") that is heat sealable.

TABLE E

COMPARISON OF NMMO CELLOPHANE V. VISCOSE CELLOPHANE

| Samples | Gauge (mils) | % Elongation MD/TD At Break | Dry Tensile Strength, psi MD/TD | % TDO |
|---|---|---|---|---|
| NMMO CELLULOSE CELLOPHANE | | | | |
| 2348-14-19 | 0.63 | 33/25 | 19,840/18,180 | 195 |
| 2308-133-3A | 0.49 | 30/17 | 19,130/21,460 | 214 |
| 2325-45-11 | 0.57 | 19/11 | 22,340/23,500 | 235 |
| 2308-136-6A | 0.614 | 55/24 | 25,600/22,250 | 210 |
| 2308-136-9A | 0.65 | 40/30 | 20,940/22,150 | 210 |
| VISCOSE CELLULOSE CELLOPHANE | | | | |
| Uncoated, nonheat | 1 | 16/60 | 18,000/8,000 | — |
| Nitrocel.*, nonheat | 1 | 20/50 | 18,000/8,000 | — |
| Nitrocel., heat | 1 | 16/60 | 18,000/8,000 | — |
| PVDC**, heat | 1 | 22/60 | 18,000/8,000 | — |

*Nitrocel. = nitrocellulose;

Table E shows that cellophane films made by the inventive method although about one-half to about two-thirds the gauge of the films reported in the Wiley Encyclopedia, have higher tensile strengths in both the MD and TD directions, have more balanced strength, and have less TD elongation and usually more MD elongation than the viscose cellulose films.

EXAMPLE 5

Comparison of Inventive NMMO Cellulose Cellophane Film And Bioriented Polypropylene Films.

As stated earlier, bioriented polypropylene films have become the prime competitors of viscose-derived cellophanes in the marketplace. Therefore, a comparison was made between the properties of cellophane made by the inventive process and films made of BOPP. This comparison is set out in Table F where the properties of NMMO cellophane film was made of Example 4 are polypropylene films manufactured by The Borden Chemical Company, Okura & Co. Limited, and Quantum Chemical Corp.

TABLE F

COMPARISON OF NMMO CELLOPHANE AND POLYPROPYLENE

| Samples | Gauge (mils) | % Elongation MD/TD At Break | Dry Tensile Strength, psi MD/TD | % TDO |
|---|---|---|---|---|
| NMMO CELLULOSE CELLOPHANE | | | | |
| 2348-14-19 | 0.63 | 33/25 | 19,840/18,180 | 195 |
| 2308-133-3A | 0.49 | 30/17 | 19,130/21,460 | 214 |
| 2325-45-11 | 0.57 | 19/11 | 22,340/23,500 | 235 |
| 2308-136-6A | 0.614 | 55/24 | 25,600/22,250 | 210 |
| 2308-136-9A | 0.65 | 40/30 | 20,940/22,150 | 210 |
| BIORIENTED POLYPROPYLENE ("BOPP") | | | | |
| Borden BOPP | various | 150/50 | 20,000/36,000 | |
| Okura BOPP | 0.50 | 140/— | 11,600/— | |
| Quantum BOPP | 0.80 | 150/40 | 19,000/45,000 | |

As can be seen from Table F, the MD tensile strengths of both types of film are generally close. The TD tensile strength of the polypropylene films are greater because of a higher TD orientation. However, the ratio of MD/TD at % elongation at the breaking point is more balanced in the cellophane films according to the present invention and would compete favorably with the polypropylene films.

Although preferred embodiments of this invention have been described in detail, it is contemplated that modifications thereof may be made and that some preferred features maybe employed without others, all within the spirit and scope of the broad invention.

What is claimed is:

1. A method for forming a seamless cellulose tubular film of nonderivatized cellulose comprising:
   a) extruding a solution of nonderivatized cellulose, tertiary amine N-oxide cellulose solvent and water as a tube through an air gap and into a nonsolvent bath while internally cooling said tube in said air gap;
   b) removing the tertiary amine N-oxide solvent from the extruded tube to form a substantially solvent-free wet tube of nonderivatized cellulose having a substantially uniform first diameter; and
   c) inflating said wet tube to a second larger diameter and maintaining said second larger diameter while drying said wet tube such that the resulting seamless cellulose tubular film
      i) has a dry flat width at least 55% to about 200% greater than the flat width of said wet tube and
      ii) retains a greater percentage of work-to-rupture than a comparable viscose cellulose tubular film subjected to the same drying conditions.

2. A method for forming a seamless cellulose tubular film of nonderivatized cellulose comprising:
   a) downwardly extruding from an annular die orifice, a solution of nonderivatized cellulose, tertiary amine N-oxide cellulose solvent and water at a temperature between about 200° F. and about 240° F., the solution being extruded in the form of a tube;
   b) continuously passing said extruded tube from said annular die orifice downwardly through an air length and into a nonsolvent first bath, the air length as measured from the annular die gap to the surface of the first bath being about 4 to 12 inches;
   c) internally cooling said tube of extruded solution in said air length;
   d) maintaining said extruded tube in contact with the nonsolvent first bath for a time sufficient for removing the tertiary amine N-oxide solvent from the extruded tube to form a substantially solvent-free wet tube of nonderivatized cellulose;
   e) passing said solvent-free wet tube through a nonsolvent second bath;
   f) drawing the wet tube from the nonsolvent second bath and inflating it to expand the diameter of the wet tube from about 55% to about 200%;
   g) maintaining the inflated diameter of the wet tube while drying it to form said seamless cellulose tubular film that has a dry flat width from at least 55% to about 200% greater than its wet flat width.

3. A method according to claim 2, wherein:
   a) internally cooling said extruded tube is done with a liquid containing about 10% to about 50% by wt. of N-methylmorpholine oxide while passing the extruded tube through an air length of from about 4 inches to about 12 inches long;
   b) contacting said extruded tube in said first bath with a solution containing from about 0% to about 30% by weight of N-methylmorpholine oxide and having a solution temperature from about 30° to about 100° F.; and
   c) contacting said wet tube in said second bath with a nonsolvent at a temperature of from about 130° to about 190° F.

4. A method according to claim 3, wherein
   a) internally cooling said extruded tube is done with a liquid containing about 15% to about 40% by wt. of N-methylmorpholine oxide while passing the extruded tube through an air length of from about 5 inches to about 11 inches long;
   b) contacting said extruded tube in said first bath with a solution containing from 8% to 22% by weight of N-methylmorpholine oxide at a solution temperature from about 35° to 90° F.; and
   c) contacting said wet tube in said second bath with a nonsolvent at a temperature of from about 140° to about 180° F.

5. A method according to claim 4, wherein
   a) said internally cooling said extruded tube is done with a liquid containing about 25% to about 35% by wt. of N-methylmorpholine oxide while passing the extruded tube through an air length of from about 5 inches to about 11 inches long;
   b) contacting said extruded tube in said first bath with a solution containing from 11% to 19% by weight of N-methylmorpholine oxide at a solution temperature from about 40° to 50° F.; and
   c) contacting said wet tube in said second bath with a nonsolvent at a temperature of from about 150° to about 180° F.

6. A method according to claim 2, wherein said seamless cellulose tubular film is a sausage casing.

7. A method according to claim 2, wherein said dried seamless cellulose tubular film is slit to form a flat film.

8. A method of forming a tubular cellulose film comprising:

a) continuously extruding a solution of cellulose, N-methylmorpholine oxide (NMMO) and water from an annular die orifice through an air length 4 to 11 inches and into a bath of nonsolvent liquid containing an 11% to 19% NMMO solution at a temperature of 50° to 80° F.;

b) retaining said continuously extruded solution in said first bath for a time to remove sufficient NMMO from said extruded solution to form a wet tube having a first diameter;

c) drawing the wet tube from said bath;

d) inflating said wet tube to a second diameter up to 140% grater than said first diameter; and e) maintaining said second diameter while drying said wet tube to form said tubular cellulose film and said film, when rewet, having a retained transverse work-to-rupture such that the value of said retained work-to-rupture versus the percent of said wet tube diameter increase is a line having a slope greater than −0.836.

* * * * *